United States Patent
Kim et al.

(10) Patent No.: US 9,614,227 B2
(45) Date of Patent: Apr. 4, 2017

(54) FUEL CELL AND METHOD OF MANUFACTURING SAME

(71) Applicant: LG CHEM, LTD., Seoul (KR)

(72) Inventors: Kwanghyun Kim, Daejeon (KR); Gyo Hyun Hwang, Daejeon (KR); Sang Hoon Kim, Daejeon (KR); Jun Yeon Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/902,263

(22) PCT Filed: Oct. 31, 2014

(86) PCT No.: PCT/KR2014/010390
§ 371 (c)(1),
(2) Date: Dec. 30, 2015

(87) PCT Pub. No.: WO2015/065120
PCT Pub. Date: May 7, 2015

(65) Prior Publication Data
US 2016/0372757 A1    Dec. 22, 2016

(30) Foreign Application Priority Data
Nov. 1, 2013 (KR) .................. 10-2013-0132401

(51) Int. Cl.
*H01M 8/10* (2016.01)
*H01M 4/86* (2006.01)
(Continued)

(52) U.S. Cl.
CPC ............. *H01M 4/8626* (2013.01); *B22F 9/24* (2013.01); *B82B 1/00* (2013.01); *B82B 3/00* (2013.01); *B82Y 30/00* (2013.01); *B82Y 40/00* (2013.01); *H01M 4/8647* (2013.01); *H01M 4/88* (2013.01); *H01M 4/92* (2013.01); *H01M 4/925* (2013.01); *H01M 8/1004* (2013.01);
(Continued)

(58) Field of Classification Search
CPC ...... H01M 4/8626; H01M 4/92; H01M 4/925; H01M 4/8647; H01M 4/88; H01M 4/9041; H01M 4/9075; H01M 4/926; H01M 8/1004
See application file for complete search history.

(56) References Cited

U.S. PATENT DOCUMENTS

2003/0121364 A1    7/2003 Sun
2010/0258759 A1   10/2010 Archer et al.
(Continued)

FOREIGN PATENT DOCUMENTS

CN      102196863 A    9/2011
EP       1623780 A1    2/2006
(Continued)

OTHER PUBLICATIONS

Lanhua Yi et al., "Carbon supported Pt hollow nanospheres as anode catalysts for direct borohydride-hydrogen peroxide fuel cells", International Journal of hydrogen energy, 36 (2011), pp. 11512-11518.
(Continued)

*Primary Examiner* — Jane Rhee
(74) *Attorney, Agent, or Firm* — Dentons US LLP

(57) ABSTRACT

The present application relates to a fuel cell and a method of manufacturing the same.

18 Claims, 11 Drawing Sheets

(51) Int. Cl.
*B82B 1/00* (2006.01)
*B82B 3/00* (2006.01)
*H01M 4/92* (2006.01)
*B82Y 30/00* (2011.01)
*B22F 9/24* (2006.01)
*B82Y 40/00* (2011.01)
*H01M 4/88* (2006.01)
*H01M 8/1004* (2016.01)
*H01M 4/90* (2006.01)

(52) U.S. Cl.
CPC ..... *B22F 2009/245* (2013.01); *B22F 2301/15* (2013.01); *B22F 2301/25* (2013.01); *B22F 2304/054* (2013.01); *B22F 2998/10* (2013.01); *H01M 4/9041* (2013.01); *H01M 4/9075* (2013.01); *H01M 4/926* (2013.01); *Y02P 70/56* (2015.11)

(56) References Cited

U.S. PATENT DOCUMENTS

| | | | |
|---|---|---|---|
| 2011/0275009 A1 | 11/2011 | Goto et al. | |
| 2012/0316060 A1 | 12/2012 | Shao et al. | |
| 2013/0177838 A1* | 7/2013 | Wang | B01J 23/52 |
| | | | 429/524 |

FOREIGN PATENT DOCUMENTS

| | | |
|---|---|---|
| JP | 2010-214330 A | 9/2010 |
| KR | 10-2008-0073812 A | 8/2008 |
| KR | 10-2010-0068029 A | 6/2010 |
| WO | 2012123435 A1 | 9/2012 |

OTHER PUBLICATIONS

Yaojuan Hu et al., "Synthesis of graphene-supported hollow Pt-Ni nanocatalysts for highly active elecrocatalysis toward the methanol oxidation reaction", Electrochimica Acta, 85 (2012) pp. 314-321.

M. A. Mahmoud et al., "Metallic Double Shell Hollow Nanocages: The Challenges of Their Synthetic Techniques", (2012) Langmuir, American Chemical Society, vol. 28, pp. 4051-4059.

X. Xia et al. "25th Anniversary Article: Galvanic Replacement: A Simple and Versatile Route to Hollow Nanostructures with Tunable and Well-Controlled Properties", Advanced Materials, 2013, 25, pp. 6313-6333.

Shaojun Guo et al.: "High-Efficiency and Low-Cost Hybrid Nanomaterial as Enhancing Electrocatalyst: Spongelike Au/Pt Core/Shell Nanomaterial with Hollow Cavity", J. Phys. Chem, C 2007, 111, pp. 17104-17109.

"Maehara method of reducing books to make metal colloids and grudging it with carriers," [partial translation] pp. 114-115 (2007).

* cited by examiner

FUEL CELL AND METHOD OF MANUFACTURING SAME

TECHNICAL FIELD

This application is a National Stage Entry of International Application No. PCT/KR2014/010390, filed Oct. 31, 2014, and claims the benefit of and priority to Korean Application No. 10-2013-0132401, filed Nov. 1, 2013, both of which are incorporated herein by reference in their entirety for all purposes as if fully set forth herein.

The present application relates to a fuel cell and a method of manufacturing the same.

BACKGROUND ART

Recently, existing energy resources such as petroleum or coal have been expected to be exhausted, and thus an interest in energy that can replace the existing energy resources has been increased. A fuel cell as one of this alternative energy particularly receives attention due to merits in that the fuel cell has high efficiency, a pollutant such as $NO_x$ and $SO_x$ is not discharged, and used fuel is plentiful.

The fuel cell is an apparatus electrochemically reacting fuel and an oxidizing agent to generate electric energy. In the fuel cell, hydrogen is used as fuel, oxygen is used as the oxidizing agent, and an electrode is formed of an anode performing a catalyst role in a hydrogen oxidation reaction (HOR) and a cathode performing a catalyst role in an oxygen reduction reaction (ORR). In the fuel cell, the electrode includes a catalyst performing the aforementioned catalyst role, and platinum is generally used as a catalyst material. However, since platinum has problems in that a cost is high and a limit to an impurity is low, a lot of research has been conducted to manufacture and use a catalyst providing electrochemical activity and stability that are superior to those of pure platinum while reducing a use amount of platinum. In the aforementioned research, a plan for increasing activity of itself of platinum or an electrode catalyst of an alloy type of platinum and a transition metal is mostly proposed, but recently, an interest in a nanoparticle structure type having electrochemical activity and stability, particularly a hollow nanoparticle, has been increased.

Examples of a method of synthesizing hollow metal nanoparticles include a method of reducing metal ions on a solution by a reducing agent, a method using a gamma ray, an electrochemical method, and the like, but in the existing methods, since it is difficult to synthesize nanoparticles having a uniform size and shape or an organic solvent is used, various reasons such as problems such as environmental pollution and high costs occur, and thus it is difficult to perform mass production of high quality nanoparticles economically.

Further, since the hollow metal nanoparticles become easily unstable by a heat treatment temperature or a reaction temperature, there are many cases where the hollow metal nanoparticles are dispersed in a carrier to be used. Therefore, there is a demand for development of a method of effectively carrying high quality hollow metal nanoparticles having a uniform size in a carrier.

DETAILED DESCRIPTION OF THE INVENTION

Technical Problem

The problems to be solved by the present application are to provide a fuel cell including a carrier-hollow metal nanoparticle complex where metal particles having a uniform nanosize are carried in a carrier as an electrode catalyst, and a method of manufacturing the same.

The problems to be solved by the present application are not limited to the aforementioned technical problems, and other unmentioned technical problems may be clearly understood by a person skilled in the art from the following description.

Technical Solution

An exemplary embodiment of the present application provides a fuel cell including: a cathode; an anode; and an electrolyte membrane provided between the cathode and the anode, in which at least one of the cathode and the anode includes a carrier-hollow metal nanoparticle complex where a hollow metal nanoparticle including a hollow core portion; a shell portion including a first metal and a second metal; and a cavity ranging from an external surface of the shell portion to the hollow core in one or two or more regions of the shell portion is carried in a carrier.

Another exemplary embodiment of the present application provides a method of manufacturing a fuel cell, including: preparing an electrolyte membrane; forming a cathode on one surface of the electrolyte membrane; and forming an anode on another surface of the electrolyte membrane, in which at least one of the cathode and the anode includes a carrier-hollow metal nanoparticle complex where a hollow metal nanoparticle including a hollow core portion; a shell portion including a first metal and a second metal; and a cavity ranging from an external surface of the shell portion to the hollow core in one or two or more regions of the shell portion is carried in a carrier.

Advantageous Effects

In a fuel cell of the present application, at least one electrode includes a carrier-hollow metal nanoparticle complex, and the carrier-hollow metal nanoparticle is a complex where hollow metal nanoparticles having a uniform size of several nanometers are carried in a carrier, and dispersivity and a carrying ratio of the hollow metal nanoparticles to the carrier are excellent, and thus an excellent catalyst effect may be exhibited.

Further, there is a merit in that the hollow metal nanoparticle carried in the carrier includes a cavity and even an internal surface area of the hollow metal nanoparticle may be utilized as a contact area where a reaction occurs through the cavity, and thus catalyst efficiency is significantly increased.

BEST MODE

Figure 1:
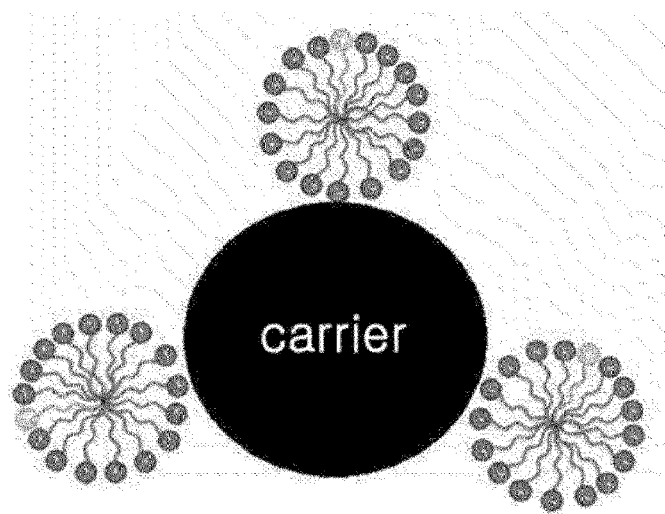
FIG. 1 schematically illustrates a figure of formation of a micelle on a carrier by a surfactant in a process of manufacturing a carrier-hollow metal nanoparticle complex according to one exemplary embodiment of the present application.
Figure 2:
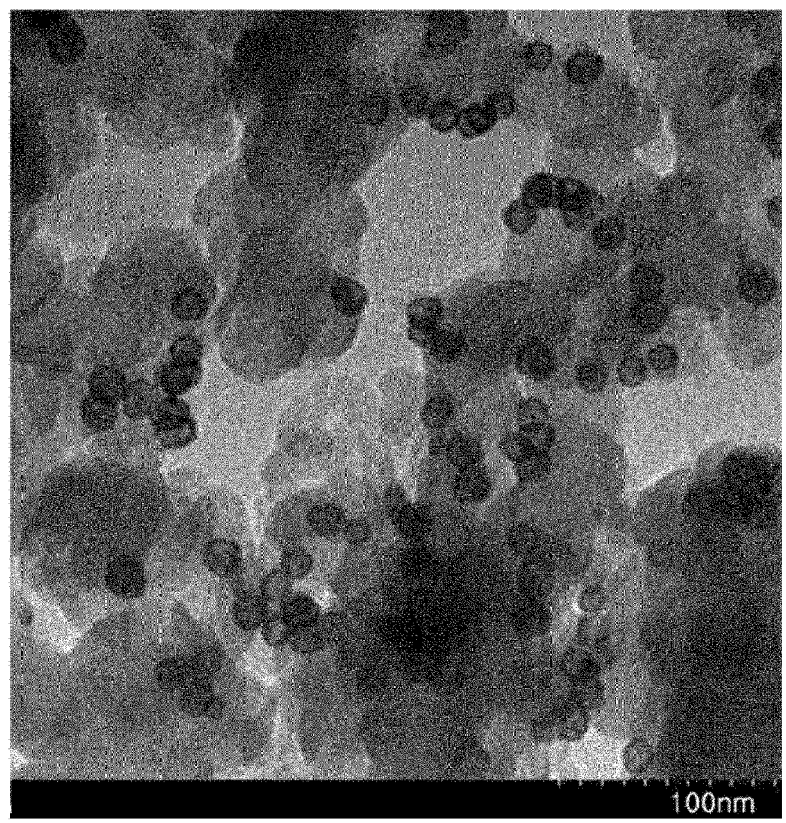
FIGS. 2 to 5 illustrate a transmission electron microscope (TEM) image of a carrier-hollow metal nanoparticle complex manufactured by Preparation Example 1.
Figure 3:
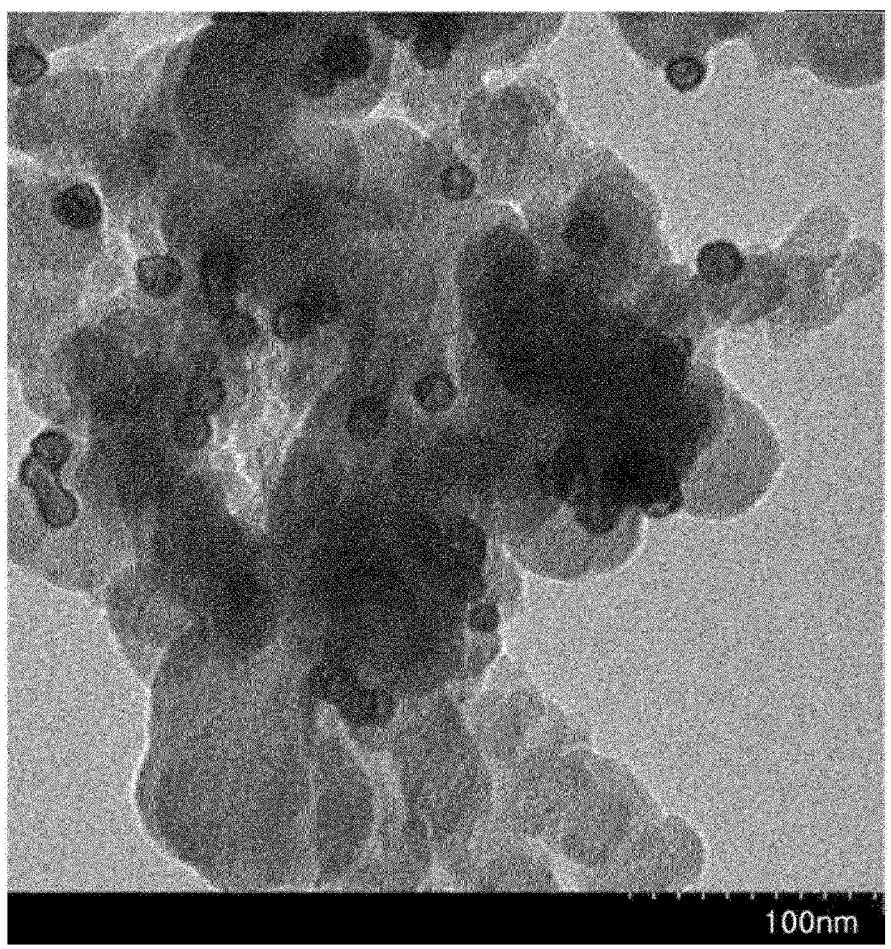

Advantages and characteristics of the present application, and methods for achieving them will be apparent with reference to embodiments described below in detail in addition to the accompanying drawings. However, the present application is not limited to the exemplary embodiments to be disclosed below but may be implemented in various forms. Therefore, exemplary embodiments introduced herein are provided to make disclosed contents thorough and complete and sufficiently transfer the spirit of the present application to those skilled in the art, and the present application is just defined by the scope of the appended claims. The sizes and the relative sizes of constituent elements shown in the drawings may be exaggerated for clarity of description.

Unless otherwise defined, all terms used herein, including technical or scientific terms, have the same meanings as those commonly understood by those skilled in the art to which the present application belongs. Further, such terms as those defined in a generally used dictionary are to be interpreted to have the meanings equal to the contextual meanings in the relevant field of art, and are not to be interpreted to have idealized or excessively formal meanings unless clearly defined in the present application.

Hereinafter, the present application will be described in detail.

The present application provides a fuel cell including: a cathode; an anode; and an electrolyte membrane provided between the cathode and the anode, in which at least one of the cathode and the anode includes a carrier-hollow metal nanoparticle complex where a hollow metal nanoparticle including a hollow core portion; a shell portion including a first metal and a second metal; and a cavity ranging from an external surface of the shell portion to the hollow core in one or two or more regions of the shell portion is carried in a carrier.

The present application provides a carrier-hollow metal nanoparticle complex where a hollow metal nanoparticle including a hollow core portion; a shell portion including a first metal and a second metal; and a cavity ranging from an external surface of the shell portion to the hollow core in one or two or more regions of the shell portion is carried in a carrier.

The fuel cell according to an exemplary embodiment of the present application is a type where a catalyst layer of the anode and a catalyst layer of the cathode come into contact with the electrolyte membrane, and may be manufactured according to a general method known in the art. For example, the fuel cell may be manufactured by thermal compression at 100° C. to 400° C. in a state where the cathode; the anode; and the electrolyte membrane positioned between the cathode and the anode are in close contact with each other.

The anode may include an anode catalyst layer and an anode gas diffusion layer. The anode gas diffusion layer may include again an anode fine pore layer and an anode base material.

The cathode may include a cathode catalyst layer and a cathode gas diffusion layer. The cathode gas diffusion layer may include again a cathode fine pore layer and a cathode base material.

Figure 11:
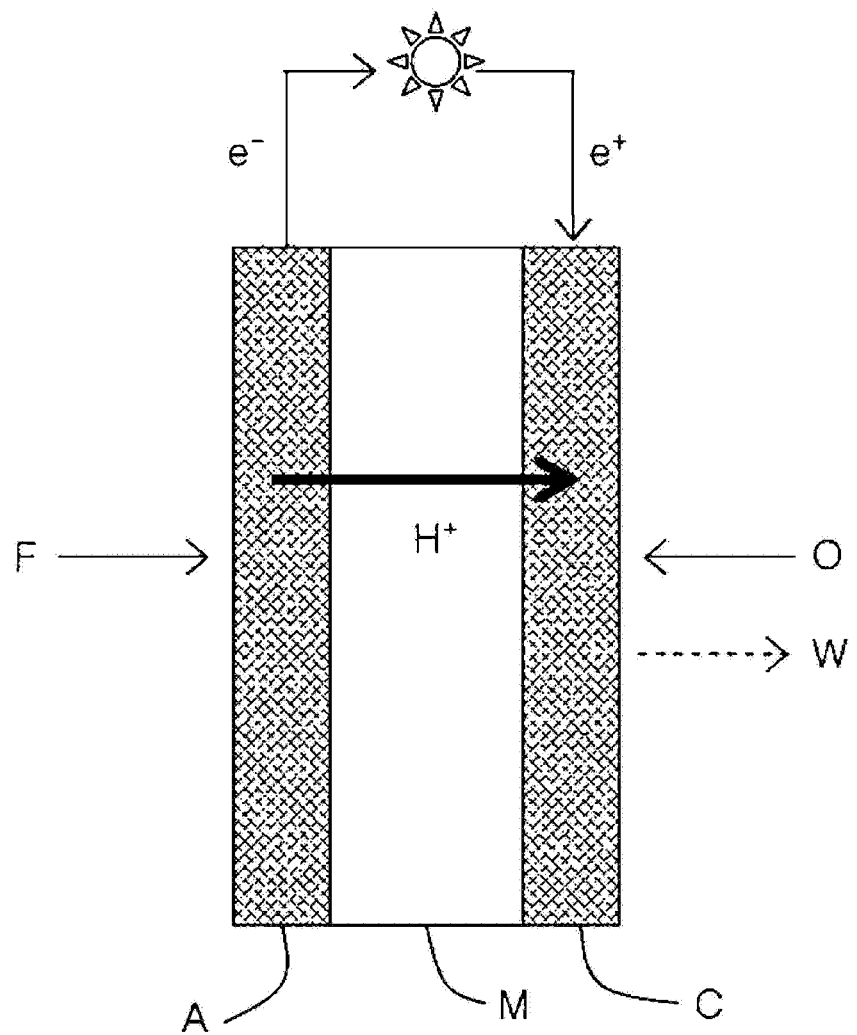
FIG. 11 schematically illustrates a generation principle of electricity of a fuel cell.

FIG. 11 schematically illustrates a generation principle of electricity of the fuel cell, and in the fuel cell, the most basic unit generating electricity is a membrane electrode assembly MEA which is constituted by an electrolyte membrane M, and an anode electrode A and a cathode electrode C formed on both surfaces of the electrolyte membrane M. Referring to FIG. 11 illustrating the generation principle of electricity of the fuel cell, in the anode electrode A, an oxidation reaction of fuel F such as hydrogen, methanol, or hydrocarbons such as butane occurs, and thus hydrogen ions (W) and electrons (e) are generated, and the hydrogen ions move through the electrolyte membrane M to the cathode electrode C. In the cathode electrode C, the hydrogen ions transferred through the electrolyte membrane M, the oxidizing agent O such as oxygen, and the electrons are reacted to generate water W. The electrons move to an external circuit by this reaction.

As described above, the membrane-electrode assembly MEA means an assembly of an electrode (the cathode and the anode) where an electrochemical catalyst reaction of fuel and air occurs and a polymer membrane where transferring of the hydrogen ions occurs, and is a single integral unit where the electrode (the cathode and the anode) and the electrolyte membrane adhere.

Figure 12:
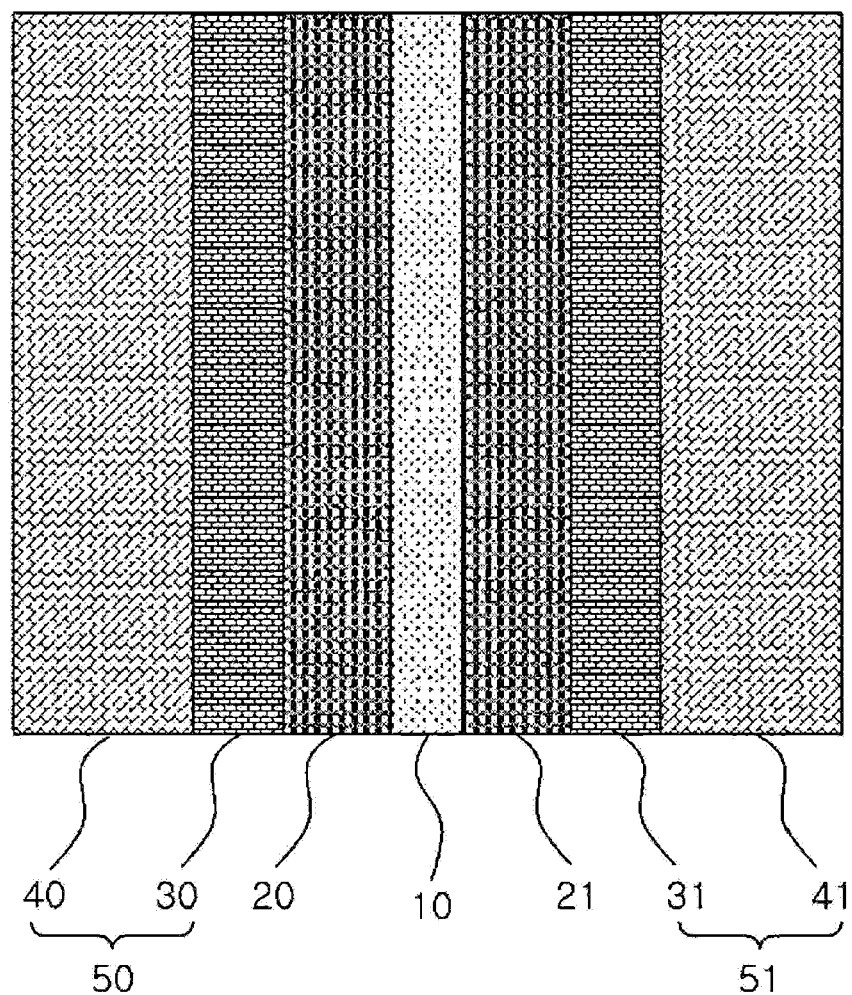
FIG. 12 schematically illustrates a structure of a membrane electrode assembly for a fuel cell according to the exemplary embodiment of the present application.

FIG. 12 schematically illustrates a structure of a membrane electrode assembly for a fuel cell, and the membrane electrode assembly for the fuel cell is provided with an electrolyte membrane 10 and the anode and the cathode positioned to face each other while the electrolyte membrane 10 is interposed therebetween.

The anode is constituted by an anode catalyst layer 20 and an anode gas diffusion layer 50, and the anode gas diffusion layer 50 is constituted again by an anode fine pore layer 30 and an anode base material 40. Herein, the anode gas diffusion layer is provided between the anode catalyst layer and the electrolyte membrane.

The cathode is constituted by a cathode catalyst layer 21 and a cathode gas diffusion layer 51, and the cathode gas diffusion layer 51 is constituted again by a cathode fine pore layer 31 and a cathode base material 41. Herein, the cathode gas diffusion layer is provided between the cathode catalyst layer and the electrolyte membrane.

FIG. 12 illustrates the anode and the cathode divided into the catalyst layer and the gas diffusion layer, but the present application is not limited thereto and structures of the anode and the cathode may be changed if necessary.

At least one of the catalyst layer of the anode and the catalyst layer of the cathode may include the carrier-hollow metal nanoparticle complex as a catalyst. As the residue, the catalyst selected from the group consisting of platinum, ruthenium, osmium, a platinum-ruthenium alloy, a platinum-osmium alloy, a platinum-palladium alloy, and a platinum-transition metal alloy may be preferably used. The aforementioned catalysts may be used by itself, and may be used while being carried in a carbon-based carrier.

In the case where the carrier-hollow metal nanoparticle complex is used as the catalyst, since the hollow metal nanoparticle has a wide surface area by the hollow and the cavity, a reaction area is increased, and thus an effect of increasing catalyst activity may be secured, and moreover, performance of the fuel cell may be increased.

A process of introducing the catalyst layer may be performed by a general method known in the art, and for example, a catalyst ink may be directly applied on the electrolyte membrane or applied on the gas diffusion layer to form the catalyst layer. In this case, a coating method of the catalyst ink is not particularly limited, but spray coating, tape casting, screen printing, blade coating, die coating, or spin coating methods or the like may be used. The catalyst ink may be representatively formed of a catalyst, a polymer ionomer, and a solvent.

The gas diffusion layer becomes a movement passage of a reaction gas and water together with a role as a current conductor, and has a mesoporous structure. Therefore, the gas diffusion layer may include a conductive base material. As the conductive base material, a carbon paper, a carbon cloth, or a carbon felt may be preferably used. The gas diffusion layer may further include a fine pore layer between the catalyst layer and the conductive base material. The fine pore layer may be used to improve performance of the fuel cell under a low humidification condition, and serves to reduce an amount of water emitted to the outside of the gas diffusion layer and thus allow the electrolyte membrane to be in a sufficient moistening state.

Specifically, the present application provides a polymer electrolyte-type fuel cell including a stack including one or two or more membrane-electrode assemblies and a bipolar plate interposed between the membrane-electrode assemblies; a fuel supply portion supplying fuel to the stack; and an oxidizing agent supply portion supplying an oxidizing agent to the stack.

The fuel cell according to the exemplary embodiment of the present application includes the stack, the fuel supply portion, and the oxidizing agent supply portion.

Figure 13:
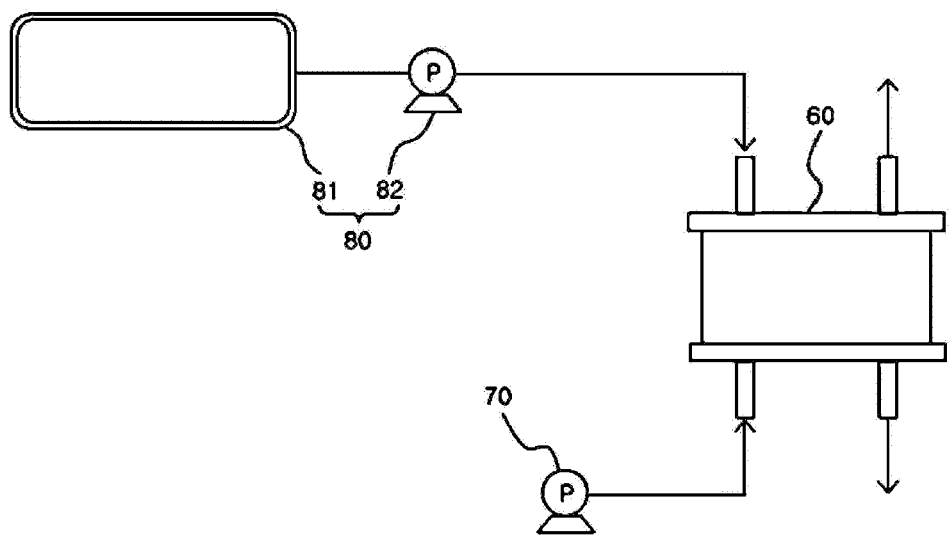
FIG. 13 schematically illustrates a fuel cell according to the exemplary embodiment of the present application.

FIG. 13 schematically illustrates a structure of the fuel cell, and the fuel cell includes a stack 60, an oxidizing agent supply portion 70, and a fuel supply portion 80.

The stack 60 includes one or two or more membrane electrode assemblies described in the above, and in the case where two or more membrane electrode assemblies are included, a separator interposed therebetween is included. The separator serves to prevent the membrane electrode assemblies from being electrically connected and transfer fuel and the oxidizing agent supplied from the outside to the membrane electrode assembly.

The oxidizing agent supply portion 70 serves to supply the oxidizing agent to the stack 60. As the oxidizing agent, oxygen is representatively used, and oxygen or air may be injected by a pump 70 to be used.

The fuel supply portion 80 serves to supply fuel to the stack 60, and may be constituted by a fuel tank 81 storing fuel, and a pump 82 supplying fuel stored in the fuel tank 81 to the stack 60. As fuel, hydrogen or hydrocarbon fuel in a gas or liquid state may be used. Examples of hydrocarbon fuel may include methanol, ethanol, propanol, butanol, or a natural gas.

As the fuel cell, a polymer electrolyte fuel cell, a direct liquid fuel cell, a direct methanol fuel cell, a direct formic acid fuel cell, a direct ethanol fuel cell, a direct dimethylether fuel cell, or the like is feasible.

The hollow metal nanoparticle may include a surfactant in an internal hollow, or may not include the surfactant in the internal hollow.

According to the exemplary embodiment of the present application, the hollow core portion may include the surfactant.

According to the exemplary embodiment of the present application, the hollow core portion may not include the surfactant.

In the present application, the hollow means that the core portion of the hollow metal nanoparticle is vacant. Further, the hollow may be used as the same meaning as the hollow core. The hollow may include terms such as holes and voids.

Figure 10:
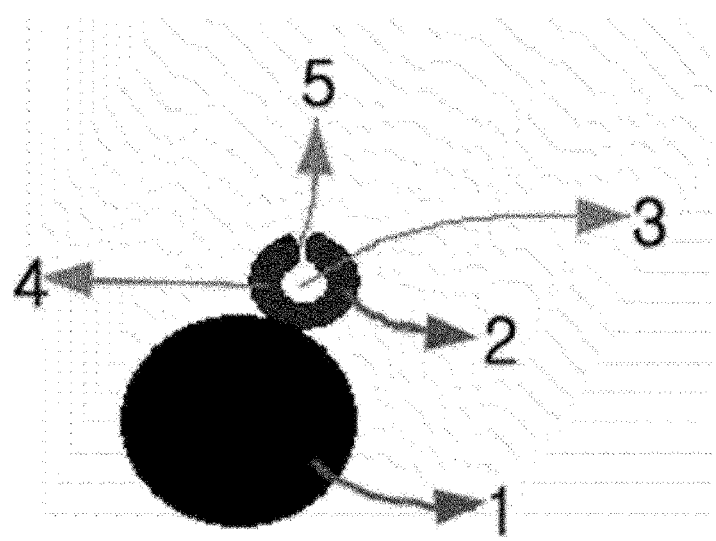
FIG. 10 schematically illustrates a structure of the carrier-hollow metal nanoparticle complex according to the exemplary embodiment of the present application.

FIG. 10 schematically illustrates a structure of the carrier-hollow metal nanoparticle complex according to the exemplary embodiment of the present application. Referring to FIG. 10, in the description, a nanoparticle 2 is carried in a carrier 1. The nanoparticle 2 is a structure having the hollow, includes a core portion 3 that is a hollow portion and a shell portion 4, and has one cavity 5 ranging from the shell portion 4 to the core portion 3.

According to the exemplary embodiment of the present application, a volume of the hollow core portion may be 50 vol % or more and less than 100 vol % of that of the hollow metal nanoparticle. Specifically, the volume of the hollow core portion may be 70 vol % or more and more specifically 80 vol % or more of that of the hollow metal nanoparticle.

According to the exemplary embodiment of the present application, the hollow may include a space where an internal material does not exist in a volume of 50 vol % or more, specifically 70 vol % or more, and more specifically 80 vol % or more. Alternatively, the hollow may include a space where 50 vol % or more, specifically 70 vol % or more, and more specifically 80 vol % or more of the inside are vacant. Alternatively, the hollow may include a space where internal porosity is 50 vol % or more, specifically 70 vol % or more, and more specifically 80 vol % or more.

According to the exemplary embodiment of the present application, the hollow metal nanoparticle may have a sphere shape. The sphere shape does not mean only a perfect sphere shape, but may include an approximate sphere shape. For example, in the hollow metal nanoparticle, an external surface of the sphere shape may not be flat, and in one hollow metal nanoparticle, the radius of curvature may not be constant.

In the exemplary embodiment of the present application, a particle diameter of the hollow metal nanoparticle may be 1 nm or more and 30 nm or less, and more specifically 20 nm or less, 12 nm or less, or 10 nm or less. Alternatively, an average particle diameter of the hollow metal nanoparticles may be 6 nm or less. The average particle diameter of the hollow metal nanoparticles may be 1 nm or more. There is a big merit in that in the case where the particle diameter of the hollow metal nanoparticle is 30 nm or less, the nanoparticles may be used in various fields. Further, it is more preferable that the particle diameter of the hollow metal nanoparticle be 20 nm or less. Further, there is a merit in that in the case where the particle diameter of the hollow metal nanoparticle is 10 nm or less, since a surface area of the particle is further increased, a possibility of application to various fields is further increased. For example, if the hollow metal nanoparticle formed in the aforementioned particle diameter range is used as the catalyst, efficiency thereof may be significantly increased.

According to the exemplary embodiment of the present application, the average particle diameter of the hollow metal nanoparticles means a value obtained by measuring an average particle diameter through a statistical distribution obtained by performing measurement with respect to 200 or more hollow metal nanoparticles by using a graphic software (MAC-View).

According to the exemplary embodiment of the present application, the average particle diameter of the hollow metal nanoparticles may be 1 nm or more and 30 nm or less.

According to the exemplary embodiment of the present application, the average particle diameter of the hollow metal nanoparticles may be 1 nm or more and 20 nm or less.

According to the exemplary embodiment of the present application, the average particle diameter of the hollow metal nanoparticles may be 1 nm or more and 12 nm or less.

According to the exemplary embodiment of the present application, the average particle diameter of the hollow metal nanoparticles may be 1 nm or more and 10 nm or less.

According to the exemplary embodiment of the present application, the average particle diameter of the hollow metal nanoparticles may be 1 nm or more and 6 nm or less.

In the exemplary embodiment of the present application, in the hollow metal nanoparticle, a thickness of the shell portion may be more than 0 nm and 5 nm or less and more specifically more than 0 nm and 3 nm or less.

For example, in the case where the hollow metal nanoparticle includes the hollow, the average particle diameter may be 30 nm or less and the thickness of the shell portion may be more than 0 nm and 5 nm or less, and more specifically, the average particle diameter of the hollow metal nanoparticles may be 20 nm or less or 10 nm or less and the thickness of the shell portion may be more than 0 nm and 3 nm or less.

According to the exemplary embodiment of the present application, the particle diameter of the hollow of the hollow metal nanoparticle may be 1 nm or more and 10 nm or less, and specifically 1 nm or more and 4 nm or less. Further, the thickness of each shell may be 0.2 nm or more and 5 nm or less, and specifically 0.25 nm or more and 3 nm or less. The shell portion may be a shell formed by mixing the first metal and the second metal, or a plurality of shells including a first shell and a second shell separately formed at different mixing ratios of the first metal and the second metal. Alternatively, the shell portion may be a plurality of shells including a first shell including only the first metal and a second shell including only the second metal.

According to the exemplary embodiment of the present application, when the hollow metal nanoparticle is manufactured, one or more hollow metal nanoparticles may be manufactured. In this case, according to the exemplary embodiment of the present application, the particle diameter of the hollow metal nanoparticle may be in the range of 80% to 120% of the average particle diameter of the hollow metal nanoparticles. Specifically, the particle diameter of the hollow metal nanoparticle may be in the range of 90% to 110% of the average particle diameter of the hollow metal nanoparticles. In the case where the particle diameter deviates from the aforementioned range, since sizes of the hollow metal nanoparticles become nonuniform overall, it may be difficult to secure intrinsic physical properties required by the hollow metal nanoparticles. For example, in the case where the carrier-hollow metal nanoparticles including the hollow metal nanoparticles having the particle diameter deviating from the range of 80% to 120% of the average particle diameter of the hollow metal nanoparticles are used as the catalyst, an efficiency improvement effect thereof may slightly become insufficient. Therefore, in the case where the particle diameter is in the range of 80% to 120% of the average particle diameter of the hollow metal nanoparticles of the specification of the present application, the nanoparticles having the uniform size may be formed to exhibit excellent physical properties as the carrier-hollow metal nanoparticle.

According to the exemplary embodiment of the present application, the hollow metal nanoparticle may include one cavity.

According to the exemplary embodiment of the present application, the shell portion may be a single layer. In this case, the shell portion of the single layer may include both the first metal and the second metal.

According to the exemplary embodiment of the present application, in the case where the shell portion is the single layer, the first metal and the second metal may exist in a mixed form. Moreover, in the case where the shell portion is the single layer, the first metal and the second metal may be uniformly or nonuniformly mixed.

According to the exemplary embodiment of the present application, the shell portion may be two or more layers. Specifically, according to the exemplary embodiment of the present application, in the case where the shell portion are two or more layers, the shell portion may include the first shell including the first metal; and the second shell including the second metal.

According to the exemplary embodiment of the present application, the first shell may include the first metal but may not include the second metal. Further, the second shell may include the second metal but may not include the first metal.

Further, according to the exemplary embodiment of the present application, in the first shell, a content of the first metal may be higher than a content of the second metal. Further, in the second shell, the content of the second metal may be higher than the content of the first metal.

According to the exemplary embodiment of the present application, the first shell may be formed in a form surrounding the hollow, and the second shell may be formed in a form surrounding the first shell.

According to the exemplary embodiment of the present application, the shell portion may include the first shell where the content of the first metal is higher than the content of the second metal; and the second shell where the content of the second metal is higher than the content of the first metal.

Specifically, according to the exemplary embodiment of the present application, in the first shell, the content of the first metal may be highest in a region that is close to the center of the hollow and the content of the first metal may be gradually decreased away from the center of the hollow. Further, in the first shell, the content of the second metal may be increased away from the center of the hollow.

Further, according to the exemplary embodiment of the present application, in the second shell, the content of the second metal may be highest in a region that is farthest from the center of the hollow and the content of the second metal may be gradually decreased nearing to the center of the hollow. Further, in the second shell, the content of the first metal may be decreased away from the center of the hollow. Specifically, the shell portion may exist in a state where the first metal and the second metal are gradated, at a portion that is adjacent to the core of the shell portion, the first metal may exist in a content of 50 vol % or more or 70 vol % or more, and at a surface portion coming into contact with the outside of the nanoparticle in the shell portion, the second metal may exist in a content of 50 vol % or more or 70 vol % or more.

According to the exemplary embodiment of the present application, an atomic percentage ratio of the first metal and the second metal of the shell portion may be 1:5 to 10:1. The atomic percentage ratio may be, in the case where the shell portion is formed of the first shell and the second shell, an atomic percentage ratio of the first metal of the first shell and the second metal of the second shell. Alternatively, the atomic percentage ratio may be, in the case where the shell portion is formed of the single layer including the first metal and the second metal, an atomic percentage ratio of the first metal and the second metal.

The shell portion may mean an external material layer surrounding the hollow. Specifically, a shape of the hollow metal nanoparticle may be determined by the shell portion.

According to the exemplary embodiment of the present application, the thickness of the shell portion may be more than 0 nm and 5 nm or less. Specifically, the thickness of the shell portion may be more than 0 nm and 3 nm or less. For example, in the case where the average particle diameter of the hollow metal nanoparticles is 30 nm or less, the thickness of the shell portion may be more than 0 nm and 5 nm or less. Alternatively, in the case where the average particle diameter of the hollow metal nanoparticles is 20 nm or less or 10 nm or less, the thickness of the shell portion may be more than 0 nm and 3 nm or less.

According to the exemplary embodiment of the present application, the first metal may be selected from the group consisting of a metal belonging to Group III to XV on a periodic table, a metalloid, a lanthanum metal, and an actinium metal. Specifically, the first metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

According to the exemplary embodiment of the present application, the second metal may be different from the first metal.

According to the exemplary embodiment of the present application, the second metal may be selected from the group consisting of a metal belonging to Group III to XV on a periodic table, a metalloid, a lanthanum metal, and an actinium metal. Specifically, the second metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

As specific examples, according to the exemplary embodiment of the present application, the first metal may be selected from the group consisting of platinum (Pt), silver (Ag), palladium (Pd), and gold (Au), and more specifically platinum (Pt). In this case, the second metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically may be nickel (Ni).

As other specific examples, according to the exemplary embodiment of the present application, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically may be nickel (Ni). In this case, the second metal may be selected from the group consisting of platinum (Pt), silver (Ag), palladium (Pd), and gold (Au), and more specifically may be platinum (Pt).

According to the exemplary embodiment of the present application, the first metal or the second metal may be different from each other, and the first metal or the second metal may be nickel.

According to the exemplary embodiment of the present application, the first metal or the second metal may be different from each other, and the first metal or the second metal may be platinum.

According to the exemplary embodiment of the present application, the first metal may be nickel, and the second metal may be platinum.

According to the exemplary embodiment of the present application, the carrier may be a carbon-based material or an inorganic minute particle.

The carbon-based material may be selected from the group consisting of a carbon nanotube (CNT), graphite, graphene, an activated carbon, a mesoporous carbon, a carbon black, a carbon nanofiber, a carbon nanowire, a carbon nanohorn, a carbon aerogel, a carbon nanoring, fullerene (C60), and Super P.

Examples of the carbon black include a DENCA black, a KETJEN black, an acetylene black, or the like.

The carbon nanotube may include one of SWCNT, DWCNT, MWCNT, functionalized SWCNT, functionalized DWCNT, functionalized MWCNT, purified SWCNT, purified DWCNT, or purified MWCNT, or a mixture thereof. The carbon nanotube has a tube shape where a graphene sheet is rolled without a joint. The carbon nanotube where the number of the tubes is one is called a single walled carbon nanotube (SWCNT), the carbon nanotube where two tubes are rolled is called a double-walled carbon nanotube (DWCNT), and the carbon nanotube where two or more tubes are rolled is called a multi-walled carbon nanotube (MWCNT).

The inorganic minute particle may be selected from the group consisting of alumina, silica, titania, and zirconia.

In the carrier-hollow metal nanoparticle complex manufactured according to one exemplary embodiment of the present application, a carrying ratio of the hollow metal nanoparticle to the carrier may be 10 wt % to 70 wt %.

In the present application, the cavity may mean an empty space continuously ranging from one region of an external surface of the hollow metal nanoparticle. The cavity may be formed in a form of one tunnel from an external surface of the shell portion to the hollow core in one or two or more regions of the shell portion. The form of the tunnel may be a straight line, a continuous form of a curved line or a straight line, and a continuous form where a curved line and a straight line are mixed.

According to the exemplary embodiment of the present application, the cavity may be an empty space ranging from the external surface of the shell portion to the hollow.

Further, according to the exemplary embodiment of the present application, the hollow metal nanoparticle may include an empty region connected from one or more surfaces of an external side to the center of the hollow nanoparticle by the cavity.

The cavity may serve to utilize an internal surface area of the hollow metal nanoparticle. Specifically, in the case where the hollow metal nanoparticle is used for the purpose of the catalyst, the cavity may serve to increase an area of a surface that may come into contact with a reaction material. Therefore, the cavity may serve to exhibit high activity of the hollow metal nanoparticle.

Specifically, the hollow metal nanoparticle may include the cavity to increase the surface area by 20% to 100% as compared to the hollow metal nanoparticle in the case where there is no cavity.

According to the exemplary embodiment of the present application, a diameter of the cavity may be 5% or more and 30% or less, specifically 5% or more and 20% or less, and more specifically 5% or more and 15% or less of the particle diameter of the hollow metal nanoparticle.

The diameter of the cavity may mean a diameter of a hole formed in the shell portion, and may mean a diameter of a tunnel ranging from the external surface of the shell portion to the hollow core.

In the case where the diameter of the cavity is less than 5% of the particle diameter of the hollow metal nanoparticle, activity of the hollow metal nanoparticle may not be sufficiently exhibited. Further, in the case where the diameter of the cavity is more than 30% of the particle diameter of the hollow metal nanoparticle, the shape of the hollow metal nanoparticle may not be maintained. Therefore, there may be a merit in that in the case where the diameter of the cavity is 5% or more and 30% or less, specifically 5% or more and 20% or less, and more specifically 5% or more and 15% or less of the particle diameter of the hollow metal nanoparticle, a contact area with the reaction material through the cavity may be sufficiently increased.

Further, the present application provides a method of manufacturing a fuel cell, including: preparing an electrolyte membrane; forming a cathode on one surface of the electrolyte membrane; and forming an anode on another surface of the electrolyte membrane, in which at least one of the cathode and the anode includes a carrier-hollow metal nanoparticle complex where a hollow metal nanoparticle including a hollow core portion; a shell portion including a first metal and a second metal; and a cavity ranging from an external surface of the shell portion to the hollow core in one or two or more regions of the shell portion is carried in a carrier.

The cathode, the anode, and the carrier-hollow metal nanoparticle complex are the same as those described in the above.

According to the exemplary embodiment of the present application, at least one of the forming of the cathode and the forming of the anode may further include manufacturing the carrier-hollow metal nanoparticle complex, and the manufacturing of the carrier-hollow metal nanoparticle complex may include forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding the carrier to the solution to perform agitation; and adding a reducing agent to the solution to form the hollow metal nanoparticle on the carrier.

Further, the present application provides a method of manufacturing a carrier-hollow metal nanoparticle complex where a hollow metal nanoparticle including a hollow core portion; a shell portion including a first metal and a second metal; and a cavity ranging from an external surface of the shell portion to the hollow core in one or two or more regions of the shell portion is carried in a carrier, the method including: forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding the carrier to the solution to perform agitation; and adding a reducing agent to the solution to form the hollow metal nanoparticle on the carrier.

Hereinafter, the method of manufacturing the carrier-hollow metal nanoparticle complex will be described in more detail.

In the method of manufacturing the carrier-hollow metal nanoparticle complex according to the present application, a description is provided while predetermined steps are divided to describe performed processes, and reactions of individual steps are organically performed.

According to the manufacturing method, the carrier-hollow metal nanoparticle complex where the hollow metal nanoparticles having the uniform size of several nanometers are effectively carried in the carrier may be manufactured. By an existing method, it is difficult to manufacture the hollow metal nanoparticle having the size of several nanometers, it is more difficult to manufacture the hollow metal nanoparticle in the uniform size, and the carrying ratio and dispersivity are poor. However, there are merits in that according to the manufacturing method of the present application, since the hollow metal nanoparticle having the uniform size of several nanometers may be manufactured on the carrier by a simple method, a separate process of carrying the hollow metal nanoparticle in the carrier is not required and the carrying ratio and dispersivity may be improved.

The method of manufacturing the carrier-hollow metal nanoparticle complex has a merit in that since a reduction potential difference is not used, a reduction potential between the first metal ion and the second metal ion forming the shell is not considered. Since the manufacturing method uses a charge between the metal ions, the manufacturing method is simple as compared to an existing manufacturing method using a reduction potential difference, and thus mass production is easy, and the hollow metal nanoparticles carried in the carrier may be manufactured at low costs. Moreover, there is a merit in that since the reduction potential difference is not used, as compared to the existing method of manufacturing the hollow metal nanoparticle, a limit of a used metal salt is reduced, and thus various metal salts may be used.

According to the exemplary embodiment of the present application, in the manufacturing method, the hollow core may be formed in the hollow metal nanoparticle.

According to the exemplary embodiment of the present application, the forming of the solution may include forming the micelle on the solution by the first and second surfactants.

According to the exemplary embodiment of the present application, in the manufacturing method, the shell portion of the hollow metal nanoparticle may be formed by the first metal ion or the atomic group ion including the first metal ion; and the second metal ion or the atomic group ion including the second metal ion.

According to the exemplary embodiment of the present application, the first metal ion or the atomic group ion including the first metal ion may have a charge that is contrary to a charge of an external end of the first surfactant, and the second metal ion or the atomic group ion including the second metal ion may have a charge that is the same as the charge of the external end of the first surfactant.

Therefore, the first metal ion or the atomic group ion including the first metal ion may be positioned in the external end of the first surfactant forming the micelle in the solution to form a shape surrounding an external surface of the micelle. Moreover, the second metal ion or the atomic group ion including the second metal ion may form a shape surrounding an external surface of the first metal ion or the atomic group ion including the first metal ion. The first metal salt and the second metal salt may form the shell portions each including the first metal and the second metal by a reducing agent.

In the present application, the external end of the surfactant may mean an external portion of the micelle of the first or second surfactant forming the micelle. The external end of the surfactant may mean a head of the surfactant. The external end may mean a hydrophilic portion. Further, the external end may determine the charge of the surfactant.

Further, the surfactant of the present application may be classified into an ionic type or a nonionic type according to a kind of the external end, and the ionic type may be a positive type, a negative type, a zwitterionic type, or an amphoteric type. The zwitterionic surfactant contains both positive and negative charges.

If the positive and negative charges of the surfactant of the present application depend on a pH, the surfactant may be an amphoteric surfactant and may be zwitterionic in a predetermined pH range. Specifically, in the present specification, a negative ionic surfactant may mean that the external end of the surfactant has the negative charge, and a positive ionic surfactant may mean that the external end of the surfactant has the positive charge.

According to the exemplary embodiment of the present application, in the hollow metal nanoparticle manufactured by the aforementioned manufacturing method, the cavity may be formed in one or two or more regions of the shell portion.

The cavity may mean an empty space continuously ranging from one region of the external surface of the hollow metal nanoparticle. The cavity may be formed in a form of one tunnel from one region of the external surface of the shell portion. The form of the tunnel may be a straight line, a continuous form of a curved line or a straight line, and a continuous form where a curved line and a straight line are mixed.

According to the exemplary embodiment of the present application, in the case where the hollow metal nanoparticle includes the hollow, the cavity may be an empty space ranging from the external surface of the shell portion to the hollow.

According to the exemplary embodiment of the present application, in the manufacturing method, a concentration; a chain length; an external end size; or a charge kind of the second surfactant may be adjusted to form the cavity in one or two or more regions of the shell portion.

According to the exemplary embodiment of the present application, the first surfactant may serve to form the micelle in the solution to form the shell portion by the metal ion or the atomic group ion including the metal ion, and the second surfactant may serve to form the cavity of the hollow metal nanoparticle.

According to the exemplary embodiment of the present application, the forming of the solution may include adjusting the size or the number of the cavity by changing concentrations of the first and second surfactants. Specifically, according to the exemplary embodiment of the present application, a mole concentration of the second surfactant may be 0.01 to 0.05 times of a mole concentration of the first surfactant. That is, the mole concentration of the second surfactant may be $1/100$ to $1/20$ times of the mole concentration of the first surfactant. Specifically, the mole concentration of the second surfactant may be $1/30$ to $1/10$ of the mole concentration of the first surfactant.

According to the exemplary embodiment of the present application, in the forming of the solution, the first surfactant and the second surfactant may form the micelle according to the aforementioned concentration ratio. The size or the number of the cavity of the hollow metal nanoparticle may be adjusted by adjusting the mole concentration ratio of the first and second surfactants. Moreover, the hollow metal nanoparticles including one or more bowl-type particles may be manufactured by continuously forming the cavities.

Further, according to the exemplary embodiment of the present application, the forming of the solution may include adjusting the size of the external end of the second surfactant to adjust the size of the cavity.

Further, according to the exemplary embodiment of the present application, the forming of the solution may include adjusting the chain length of the second surfactant to be different from the chain length of the first surfactant and thus form the cavity in a second surfactant region.

According to the exemplary embodiment of the present application, the chain length of the second surfactant may be 0.5 to 2 times of the chain length of the first surfactant. Specifically, the chain length may be determined by the number of carbon atoms.

According to the exemplary embodiment of the present application, the chain length of the second surfactant may be configured to be different from the chain length of the first surfactant to prevent the metal salt bonded to the external end of the second surfactant from forming the shell portion of the hollow metal nanoparticle.

Further, according to the exemplary embodiment of the present application, the forming of the solution may include adjusting the charge of the second surfactant to be different from the charge of the first surfactant to form the cavity.

According to the exemplary embodiment of the present application, the first metal ion or the atomic group ion including the first metal ion having the charge that is contrary to the charge of the first and second surfactants may be positioned in the external end of the first and second surfactants forming the micelle in the solvent. Further, the second metal ion having the charge that is contrary to the charge of the first metal ion may be positioned in the external surface of the first metal ion.

According to the exemplary embodiment of the present application, the first metal ion and the second metal ion formed in the external end of the first surfactant may form the shell portion of the hollow metal nanoparticle, and the first metal ion and the second metal ion positioned in the external end of the second surfactant may not form the shell but form the cavity.

According to the exemplary embodiment of the present application, in the case where the first surfactant is a negative ionic surfactant, in the forming of the solution, the first surfactant may form the micelle, and the micelle may be surrounded by the positive ion of the first metal ion or the atomic group ion including the first metal ion. Moreover, the atomic group ion including the second metal ion of the negative ion may surround the positive ion. Moreover, in the adding of the reducing agent to form the hollow metal nanoparticle, the positive ion surrounding the micelle may form the first shell, and the negative ion surrounding the positive ion may form the second shell.

Further, according to the exemplary embodiment of the present application, in the case where the first surfactant is a positive ionic surfactant, in the forming of the solution, the first surfactant may form the micelle, and the micelle may be surrounded by the negative ion of the atomic group ion including the first metal ion. Moreover, the second metal ion or the atomic group ion including the second metal ion of the positive ion may surround the negative ion. Moreover, in the adding of the reducing agent to form the hollow metal nanoparticle, the negative ion surrounding the micelle may form the first shell, and the positive ion surrounding the negative ion may form the second shell.

According to the exemplary embodiment of the present application, the forming of the hollow metal nanoparticle may include forming first and second surfactant regions forming the micelle by the hollow.

According to the exemplary embodiment of the present application, both the first surfactant and the second surfactant may be the positive ionic surfactant.

Alternatively, according to the exemplary embodiment of the present application, both the first surfactant and the second surfactant may be the negative ionic surfactant.

According to the exemplary embodiment of the present application, in the case where the first and second surfactants have the same charge, the chain length of the second surfactant may be configured to be different from the chain length of the first surfactant to form the micelle. Specifically, due to a chain length difference of the second surfactant, the first and second metal ions positioned in the external end of the second surfactant are not adjacent to the first and second metal ions positioned in the external end of the first surfactant, and thus the shell portion is not formed.

According to the exemplary embodiment of the present application, any one of the first surfactant and the second surfactant may be the negative ionic surfactant, and the other may be the positive ionic surfactant. That is, in the exemplary embodiment of the present application, the first and second surfactants may have different charges.

According to the exemplary embodiment of the present application, in the case where the first and second surfactants have different charges, the chain lengths may be configured to be different from each other to form the cavity of the hollow metal nanoparticle. In this case, a forming principle of the cavity is the same as that of the case where the first and second surfactants have the same charge.

Specifically, FIG. 1 illustrates an example of the micelle formed in the carrier according to the exemplary embodiment of the present application. According to FIG. 1, the micelle is positioned around the carrier positioned at the center. In the micelle, the external end of the first surfactant is negative ionic, and the external end of the second surfactant is positive ionic. In this case, the micelle may be surrounded by the positive ion of the first metal ion or the atomic group ion including the first metal ion. Again, a periphery thereof may be surrounded by the negative ion of the second metal ion or the atomic group ion including the second metal ion. Thereafter, if the reducing agent is added, in the forming of the hollow metal nanoparticle on the carrier, the positive ion surrounding the micelle may form the first shell, and the negative ion surrounding the positive ion may form the second shell. In this case, the external side of the second surfactant is not surrounded by the ion, and thus the shell may not be formed. Accordingly, the cavity may be formed.

According to the exemplary embodiment of the present application, in the case where the first and second surfactants have different charges, even though the chain lengths of the first and second surfactants are the same as each other, the cavity of the hollow metal nanoparticle may be formed. In this case, the external end of the second surfactant of the micelle and the external end of the first surfactant adjacent thereto exchange the charges each other to be made neutral, and thus the metal ion is not positioned. Therefore, a portion where the metal ion is not positioned does not form the shell portion, and thus the cavity of the hollow metal nanoparticle may be formed.

According to the exemplary embodiment of the present application, the first surfactant may be the negative ionic surfactant or the positive ionic surfactant, and the second surfactant may be the nonionic surfactant.

According to the exemplary embodiment of the present application, in the case where the second surfactant is the nonionic surfactant, since the metal ion is not positioned in the external end of the second surfactant, the cavity of the hollow metal nanoparticle may be formed. Therefore, in the case where the second surfactant is nonionic, even though the chain length thereof is the same as or different from that of the first surfactant, the cavity of the hollow metal nanoparticle may be formed.

According to the exemplary embodiment of the present application, the first surfactant may be the negative ionic surfactant or the positive ionic surfactant, and the second surfactant may be the zwitterionic surfactant.

According to the exemplary embodiment of the present application, in the case where the second surfactant is the zwitterionic surfactant, since the metal ion is not positioned in the external end of the second surfactant, the cavity of the hollow metal nanoparticle may be formed. Therefore, in the case where the second surfactant is zwitterionic, even though the chain length thereof is the same as or different from that of the first surfactant, the cavity of the hollow metal nanoparticle may be formed.

The negative ionic surfactant may be selected from the group consisting of N-dodecyl-N,N-dimethyl-3-ammonio-1-propane sulfonate, sodium 1-heptane sulfonate, potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and a salt thereof, glyceryl ester, sodium carboxymethylcellulose, bile acid and a salt thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and a salt thereof, calcium stearate, phosphate, carboxymethylcellulose sodium, dioctyl sulfosuccinate, dialkylester of sodium sulfosuccinic acid, phospholipid, and calcium carboxymethylcellulose. However, the negative ionic surfactant is not limited thereto.

The positive ionic surfactant may be selected from the group consisting of a quaternary ammonium compound, benzalkonium chloride, cetyltrimethylammonium bromide, chitosan, lauryldimethylbenzylammonium chloride, acyl carnitine hydrochloride, alkylpyridinium halide, cetyl pyridinium chloride, positive ionic lipid, polymethylmethacrylate trimethylammonium bromide, a sulfonium compound, polyvinylpyrrolidone-2-dimethylaminoethyl methacrylate dimethyl sulfate, hexadecyltrimethyl ammonium bromide, a phosphonium compound, benzyl-di(2-chloroethyl)ethylammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, ($C_{12}$-$C_{15}$)-dimethyl hydroxyethyl ammonium chloride, ($C_{12}$-$C_{15}$)-dimethyl hydroxyethyl ammonium chloride bromide, coconut dimethyl hydroxy ethyl ammonium chloride, coconut dimethyl hydroxyethyl ammonium bromide, myristyl trimethyl ammonium methylsulfate, lauryl dimethyl benzyl ammonium chloride, lauryl dimethyl benzyl ammonium bromide, lauryl dimethyl (ethenoxy)4 ammonium chloride, lauryl dimethyl (ethenoxy)4 ammonium bromide, N-alkyl($C_{12}$-$C_{18}$) dimethylbenzyl ammonium chloride, N-alkyl($C_{14}$-$C_{18}$) dimethyl-benzyl ammonium chloride, N-tetradecyldimethylbenzyl ammonium chloride monohydrate, dimethyl didecyl ammonium chloride, N-alkyl($C_{12}$-$C_{14}$) dimethyl 1-naphthylmethyl ammonium chloride, a trimethylammonium halide alkyl-trimethylammonium salt, a dialkyl-dimethylammonium salt, lauryl trimethyl ammonium chloride, an ethoxylated alkylamidoalkyldialkylammonium salt, an ethoxylated trialkyl ammonium salt, dialkylbenzene dialkylammonium chloride, N-didecyldimethyl ammonium chloride, N-tetradecyldimethylbenzyl ammonium chloride monohydrate, N-alkyl($C_{12}$-$C_{14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethylammonium bromide, $C_{15}$ trimethylammonium bromide, $C_{17}$ trimethylammonium bromide, dodecylbenzyltriethylammonium chloride, polydiallyldimethylammonium chloride, dimethylammonium chloride, alkyldimethylammonium halogenid, tricetylmethylammonium chloride, cetyltrimethylammonium bromide, decyltrimethylammonium bromide, dodecyltriethylammonium bromide, tetradecyltrimethylammonium bromide, methyl trioctylammonium chloride, POLYQUAT 10, tetrabutylammonium bromide, benzyltrimethylammonium bromide, choline ester, benzalkonium chloride, stearalkonium chloride, cetyl pyridinium bromide, cetyl pyridinium chloride, a halide salt of quaternized polyoxyethylalkylamine, "MIRAPOL" (polyquarternium-2), "Alkaquat" (alkyldimethylbenzylammonium chloride, manufactured by Rhodia), an alkyl pyridinium salt, amine, an amine salt, an imide azolinium salt, a protonated quaternary acrylamide, a methylated quaternary polymer, a positive ionic guar gum, benzalkonium chloride, dodecyltrimethylammonium bromide, triethanol amine, and poloxamine. However, the positive ionic surfactant is not limited thereto.

The nonionic surfactant may be selected from the group consisting of polyoxyethylene fatty alcohol ether, polyoxyethylene sorbitan fatty acid ester, polyoxyethylene fatty acid ester, polyoxyethylene alkyl ether, a polyoxyethylene castor oil derivative, sorbitan ester, glyceryl ester, glycerol monostearate, polyethylene glycol, polypropylene glycol, polypropylene glycol ester, cetyl alcohol, cetostearyl alcohol, stearyl alcohol, arylalkyl polyether alcohol, a polyoxyethylenepolyoxypropylene copolymer, poloxamer, poloxamine, methyl cellulose, hydroxy cellulose, hydroxymethyl cellulose, hydroxyethyl cellulose, hydroxypropyl cellulose, hydroxypropylmethyl cellulose, hydroxypropylmethyl cellulose phthalate, amorphous cellulose, polysaccharides, starch, a starch derivative, hydroxyethyl starch, polyvinyl alcohol, triethanolamine stearate, amine oxide, dextran, glycerol, acacia gum, cholesterol, tragacanth, and polyvinylpyrrolidone.

The zwitterionic surfactant may be selected from the group consisting of betaine, alkyl betaine, alkylamido betaine, amidopropyl betaine, cocoamphocarboxy glycinate, sarcosinate aminopropionate, aminoglycinate, imidazolinium betaine, amphoteric imidazoline, N-alkyl-N,N-dimethylammonio-1-propane sulfonate, 3-cholamido-1-propyldimethylammonio-1-propane sulfonate, dodecylphosphocholine, and sulfo-betaine. However, the zwitterionic surfactant is not limited thereto.

According to the exemplary embodiment of the present application, the concentration of the first surfactant may be one times or more and five times or less of a critical micelle concentration with respect to the solvent. Specifically, the concentration of the first surfactant may be two times of the critical micelle concentration with respect to the solvent.

In the present application, the critical micelle concentration (CMC) means a lower limit of a concentration at which the surfactant forms a group (micelle) of molecules or ions in the solution.

The most important characteristic of the surfactant is that the surfactant has an adsorption tendency on an interface, for example, an air-liquid interface, an air-solid interface, and a liquid-solid interface. In the case where the surfactants are free in the meaning that the surfactant does not exist in an agglomeration form, the surfactants are called monomers or unimers, and if a concentration of the unimers is increased, the unimers are agglomerated to form an entity of small agglomerates, that is, the micelle. This concentration may be called the critical micelle concentration.

If the concentration of the first surfactant is less than one time of the critical micelle concentration, the concentration of the first surfactant adsorbed on the first metal salt may be relatively reduced. Accordingly, an amount of the formed core particles may be reduced overall. Meanwhile, if the concentration of the first surfactant is more than 5 times of the critical micelle concentration, the concentration of the first surfactant is relatively increased, and thus the hollow metal nanoparticle forming the hollow core and the metal particle not forming the hollow core may be mixed to be agglomerated. Therefore, in the case where the concentration of the first surfactant is one time or more and five times or less of the critical micelle concentration with respect to the solvent, the hollow metal nanoparticle may be smoothly formed.

According to the exemplary embodiment of the present application, the first surfactant forming the micelle and/or the first and second metal salts surrounding the micelle may be adjusted to adjust the size of the hollow metal nanoparticle.

According to the exemplary embodiment of the present application, the size of the hollow metal nanoparticle may be adjusted by the chain length of the first surfactant forming the micelle. Specifically, if the chain length of the first surfactant is short, the size of the micelle is reduced, and thus the size of the hollow metal nanoparticle may be reduced.

According to the exemplary embodiment of the present application, the number of carbon atoms of the chain of the first surfactant may be 15 or less. Specifically, the number of carbon atoms of the chain may be 8 or more and 15 or less. Alternatively, the number of carbon atoms of the chain may be 10 or more and 12 or less.

According to the exemplary embodiment of the present application, a kind of a counter ion of the first surfactant forming the micelle may be adjusted to adjust the size of the hollow metal nanoparticle. Specifically, as the size of the counter ion of the first surfactant is increased, bonding force with a head portion of the external end of the first surfactant may be weakened to increase the size of the micelle, and thus the size of the hollow metal nanoparticle may be increased.

According to the exemplary embodiment of the present application, in the case where the first surfactant is the negative ionic surfactant, the first surfactant may include $NH_4^+$, $K^+$, $Na^+$, or $Li^+$ as the counter ion.

Specifically, in the order of the case where the counter ion of the first surfactant is $NH_4^+$, the case where the counter ion of the first surfactant is $K^+$, the case where the counter ion of the first surfactant is $Na^+$, and the case where the counter ion of the first surfactant is $Li^+$, the size of the hollow metal nanoparticle may be reduced.

According to the exemplary embodiment of the present application, in the case where the first surfactant is the positive ionic surfactant, the first surfactant may include $I^-$, $Br^-$, or $Cl^-$ as the counter ion.

Specifically, in the order of the case where the counter ion of the first surfactant is $I^-$, the case where the counter ion of the first surfactant is $Br^-$, and the case where the counter ion of the first surfactant is $Cl^-$, the size of the hollow metal nanoparticle may be reduced.

According to the exemplary embodiment of the present application, the size of the head portion of the external end of the first surfactant forming the micelle may be adjusted to adjust the size of the hollow metal nanoparticle. Moreover, in the case where the size of the head portion of the first surfactant formed on the external surface of the micelle is increased, repulsive force between the head portions of the first surfactant may be increased to increase the micelle, and thus the size of the hollow metal nanoparticle may be increased.

According to the exemplary embodiment of the present application, the size of the hollow metal nanoparticle may be determined by complex action of the aforementioned technical elements.

According to the exemplary embodiment of the present application, the metal salt is not particularly limited as long as the metal salt is ionized on the solution to provide the metal ion. The metal salt may be ionized in a solution state to provide the positive ion including the metal ion or the negative ion of the atomic group ion including the metal ion. The first metal salt and the second metal salt may be different from each other. Specifically, the first metal salt may provide the positive ion including the metal ion, and the second metal salt may provide the negative ion of the atomic group ion including the metal ion. Specifically, the first metal salt may provide the positive ion of $Ni^{2+}$, and the second metal salt may provide the negative ion of $PtCl_4^{2-}$.

According to the exemplary embodiment of the present application, the first metal salt and the second metal salt are not particularly limited as long as the metal salt is ionized on the solution to provide the metal ion or the atomic group ion including the metal ion.

According to the exemplary embodiment of the present application, the first metal salt and the second metal salt may be each independently a salt of a matter selected from the group consisting of a metal belonging to Group III to XV on a periodic table, a metalloid, a lanthanum metal, and an actinium metal.

Specifically, the first metal salt and the second metal salt are different from each other, and may be each independently a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

More specifically, according to the exemplary embodiment of the present application, the first metal salt may be a salt of a metal selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and even more specifically may be a salt of nickel (Ni).

More specifically, according to the exemplary embodiment of the present application, the second metal salt may be a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal salt may be a salt of a metal consisting of platinum (Pt), palladium (Pd), and gold (Au), and even more specifically a salt of platinum (Pt).

According to the exemplary embodiment of the present application, the first metal salt and the second metal salt may be each independently nitrates, halides such as chlorides, bromides, and iodides, hydroxides, or sulfates of the metal. However, the first metal salt and the second metal salt are not limited thereto.

According to the exemplary embodiment of the present application, in the forming of the solution, a mole ratio of the first metal salt and the second metal salt may be 1:5 to 10:1. Specifically, the mole ratio of the first metal salt and the second metal salt may be 2:1 to 5:1.

If a mole number of the first metal salt is smaller than a mole number of the second metal salt, it is difficult for the first metal ion to form the first shell including the hollow. Further, if the mole number of the first metal salt is more than 10 times of the mole number of the second metal salt, it is difficult for the second metal ion to form the second shell surrounding the first shell. Therefore, in the aforementioned range, the first and second metal ions may smoothly form the shell portion of the hollow metal nanoparticle.

According to the exemplary embodiment of the present application, the shell portion may include a first shell including the first metal ion; and a second shell including the second metal ion.

According to the exemplary embodiment of the present application, an atomic percentage ratio of the first metal and the second metal of the shell portion may be 1:5 to 10:1. The atomic percentage ratio may be, in the case where the shell portion is formed of the first shell and the second shell, an atomic percentage ratio of the first metal of the first shell and the second metal of the second shell. Alternatively, the atomic percentage ratio may be, in the case where the shell portion is formed of one shell including the first metal and the second metal, an atomic percentage ratio of the first metal and the second metal.

According to the exemplary embodiment of the present application, the forming of the solution may further include adding a stabilizer.

Examples of the stabilizer may include one or a mixture of two or more selected from the group consisting of disodium phosphate, dipotassium phosphate, disodium citrate, and trisodium citrate.

According to the exemplary embodiment of the present application, the adding of the carrier to the solution to perform agitation may be performed for 5 minutes to 120 minutes, more specifically 10 minutes to 90 minutes, even more specifically 20 minutes to 60 minutes.

The manufacturing method according to the exemplary embodiment of the present application has a merit in that before the hollow metal nanoparticle is formed, since the first metal salt and the second metal salt are dispersed in the carrier, the metal salts are uniformly dispersed. Accordingly, when the hollow metal nanoparticles are formed, agglomeration of the particles less occurs. Further, there is a merit in that adhesion force or bonding force between the carrier and the hollow metal nanoparticle is increased.

In the manufacturing method according to the exemplary embodiment of the present application, the carrier is the same as that described in the above.

According to the exemplary embodiment of the present application, the adding of the carrier to perform agitation may include dispersing the carrier in the solvent.

Specifically, if the carrier is dispersed in the solvent and then added to the solution, an entanglement phenomenon of the carrier and the particles may be reduced.

According to the exemplary embodiment of the present application, the forming of the hollow metal nanoparticle on the carrier may include further adding a nonionic surfactant together with the reducing agent.

The nonionic surfactant is adsorbed on the surface of the shell to uniformly disperse the hollow metal nanoparticles formed in the solution. Therefore, the nonionic surfactant may prevent precipitation by wadding or agglomeration of the metal particles and form the hollow metal nanoparticles in a uniform size. Specific examples of the nonionic surfactant are the same as the aforementioned examples of the nonionic surfactant.

According to the exemplary embodiment of the present application, the solvent may be a solvent including water. Specifically, according to the exemplary embodiment of the present application, the solvent is a matter dissolving the first metal salt and the second metal salt, and may be water or a mixture of water and alcohol having 1 to 6 carbon atoms, and more specifically water.

In the manufacturing method according to the present application, since an organic solvent is not used as the solvent, in the manufacturing process, a post-treatment process of treating the organic solvent is not required, and thus there are a cost reduction effect and a prevention effect of environmental pollution.

According to the exemplary embodiment of the present specification, the manufacturing method may be performed at room temperature. Specifically, the manufacturing method may be performed at a temperature in the range of 4° C. or more and 100° C. or less, more specifically a temperature in the range of 4° C. or more and 35° C. or less, and even more specifically 15° C. or more and 28° C. or less.

In the exemplary embodiment of the present application, the forming of the solution may be performed at room temperature, a temperature in the range of 4° C. or more and 100° C. or less, more specifically a temperature in the range of 4° C. or more and 35° C. or less, and even more specifically 15° C. or more and 28° C. or less. There is a problem in that if the organic solvent is used as the solvent, manufacturing should be performed at a high temperature of more than 100° C.

In the present application, since manufacturing may be performed at room temperature, the manufacturing method is simple, and thus there is a merit in a process and a cost reduction effect is large.

According to the exemplary embodiment of the present application, the forming of the solution may be performed for 5 minutes to 120 minutes, more specifically 10 minutes to 90 minutes, even more specifically 20 minutes to 60 minutes.

According to the exemplary embodiment of the present application, the adding of the reducing agent and/or the nonionic surfactant to the solution to form the hollow metal nanoparticle including the cavity may be performed at room temperature and specifically a temperature in the range of 4° C. or more and 35° C. or less. Since the manufacturing method may be performed at room temperature, the manufacturing method is simple, and thus there is a merit in a process and a cost reduction effect is large.

The forming of the hollow metal nanoparticle including the cavity may be performed by reacting the solution and the reducing agent and/or the nonionic surfactant for a predetermined time, specifically 5 minutes to 120 minutes, more specifically 10 minutes to 90 minutes, and even more specifically 20 minutes to 60 minutes.

According to the exemplary embodiment of the present application, a standard reduction potential of the reducing agent may be −0.23 V or less.

The reducing agent is not particularly limited as long as the reducing agent is a strong reducing agent having standard reduction of −0.23 V or less and specifically −4 V or more and −0.23 V or less and has reducing power capable of reducing molten metal ions to precipitate the metal ions into metal particles. Specifically, the reducing agent may be at least one selected from the group consisting of $NaBH_4$, $NH_2NH_2$, $LiAlH_4$, and $LiBEt_3H$.

In the case where a weak reducing agent is used, since there is difficulty in performing a continuous process because of a slow reaction speed and requirement of subsequent heating of the solution, there may be a problem in mass production, and particularly, there is a problem in that in the case where ethylene glycol that is a kind of the weak reducing agent is used, productivity in a continuous process is low due to a reduction in flow speed by a high viscosity. Therefore, in the case where the reducing agent is used, the aforementioned problems may be overcome.

According to the exemplary embodiment of the present application, the manufacturing method may further include, after forming the hollow metal nanoparticle including the cavity, removing the surfactant in the hollow. A removing method is not particularly limited, and for example, a washing method by water may be used. The surfactant may be the negative ionic surfactant and/or the positive ionic surfactant.

According to the exemplary embodiment of the present application, the manufacturing method may further include, after forming the hollow metal nanoparticle or removing the surfactant in the hollow, adding an acid to the hollow metal nanoparticle to remove the positive ionic metal. In this case, if the acid is added to the hollow metal nanoparticle, a 3d band metal is eluted. The positive ionic metal may be specifically selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu).

According to the exemplary embodiment of the present application, the acid is not particularly limited, and for example, an acid selected from the group consisting of a sulfuric acid, a nitric acid, a hydrochloric acid, a perchloric acid, a hydriodic acid, and a hydrobromic acid may be used.

According to the exemplary embodiment of the present application, after the hollow metal nanoparticle is formed, in order to precipitate the hollow metal nanoparticle included in the solution, the solution including the hollow metal nanoparticle may be subjected to centrifugation. After centrifugation, only the separated hollow metal nanoparticle may be collected. If necessary, a firing process of the hollow metal nanoparticle may be further performed.

According to the exemplary embodiment of the present application, the hollow metal nanoparticle having the uniform size of several nanometers may be manufactured. It is difficult to manufacture the hollow metal nanoparticle having the size of several nanometers by an existing method, and it is more difficult to manufacture the hollow metal nanoparticle in the uniform size.

The hollow metal nanoparticle may be generally used instead of an existing nanoparticle in a field where the nanoparticle may be used. In the hollow metal nanoparticle, as compared to the existing nanoparticle, since the size is very small and a specific surface area is wider, excellent activity may be exhibited as compared to the existing nanoparticle. Specifically, the hollow metal nanoparticle may be used in various fields such as a catalyst, a drug delivery, and a gas sensor. The hollow metal nanoparticle is a catalyst, and may be used as an active material medicine in cosmetics, insecticides, animal nutritional supplements, or food supplements, and may be used as a pigment in electronic goods, optical goods, or polymers.

[Mode for Disclosure]

Hereinafter, the present application will be specifically described in detail through Examples. However, the Examples according to the present application may be modified in various other forms, and the scope of the present application is not interpreted to be limited to the Examples as will be described in detail below.

The Examples of the present application are provided to more fully describe the present application to the person with ordinary skill in the art.

In the following Examples, the first metal salt is the salt including the first metal ion that is the precursor of the first metal or the atomic group ion including the first metal ion, and may serve to provide the first metal. Further, the second metal salt is the salt including the second metal ion that is the precursor of the second metal or the atomic group ion including the second metal ion, and may serve to provide the second metal.

Preparation Example 1

$Ni(NO_3)_2$ as the first metal salt, $K_2PtCl_4$ as the second metal salt, trisodium citrate as the stabilizer, ammonium lauryl sulfate (ALS) as the first surfactant, and cetyltrimethylammonium bromide (CTAB) as the second surfactant were added to distilled water to form the solution, and agitated for 30 minutes. In this case, the mole ratio of $Ni(NO_3)_2$ and $K_2PtCl_4$ was 3:1, the concentration of ALS was two times of the critical micelle concentration with respect to water, and the concentration of CTAB was 1/10 mole of that of ALS. Thereafter, the carbon (carbon black (Vulcan XC 72)) dispersed in water was added to the solution to be agitated for 30 minutes, and $NaBH_4$ that was the reducing agent was then added to perform the reaction for 30 minutes. Thereafter, centrifugation was performed at 10,000 rpm for 10 minutes to dump the supernatant of the upper layer, the residual precipitate was re-dispersed in distilled water, and the centrifugation process was repeated to manufacture the carrier-hollow metal nanoparticle complex.

Figure 4:
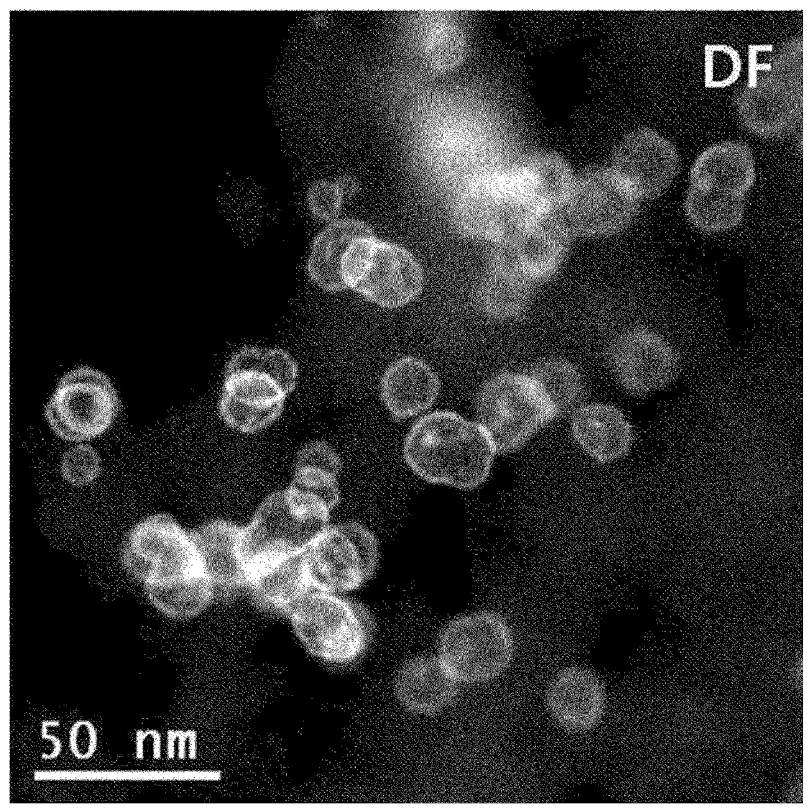
Figure 5:
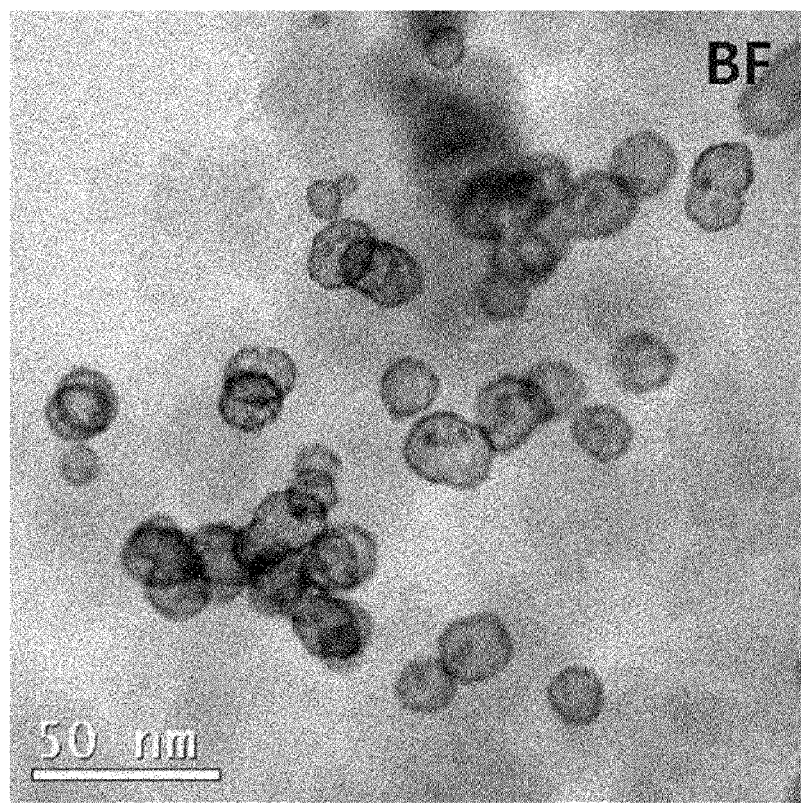

The transmission electron microscope (TEM) image of the carrier-hollow metal nanoparticle complex of the present application manufactured according to Preparation Example 1 is illustrated in FIGS. 2 to 5. FIG. 4 illustrates the dark field of the TEM, and FIG. 5 illustrates the bright field of the TEM.

In the TEM measurement result of the carrier-hollow metal nanoparticle complex according to the present application, in the case of the dark field image, when the electron bundle of the TEM comes into contact with the hollow metal nanoparticle, since diffraction largely occurs at the shell portion having the large mass, the shell portion is illustrated by the bright image, and in the region having the hollow of the nanoparticle, since diffraction of the electron bundle of the TEM relatively lightly occurs, the region is illustrated by the slightly dark image. Further, the electron bundle of the TEM penetrates the region having the cavity as it is, and thus the region is illustrated by the black image.

Preparation Example 2

$Ni(NO_3)_2$ as the first metal salt, $K_2PtCl_4$ as the second metal salt, trisodium citrate as the stabilizer, sodium dodecyl sulfate (SDS) as the first surfactant, and N-dodecyl-N,N-dimethyl-3-ammonio-1-propane sulfonate (DDAPS) as the second surfactant were added to distilled water to form the solution, and agitated for 30 minutes. In this case, the mole ratio of $Ni(NO_3)_2$ and $K_2PtCl_4$ was 3:1, the concentration of SDS was two times of the critical micelle concentration with respect to water, and the concentration of DDAPS was 1/10 mole of that of SDS. Thereafter, the carbon (carbon black (Vulcan XC 72)) dispersed in distilled water was added to the solution to be agitated for 30 minutes, and $NaBH_4$ that was the reducing agent was then added to the solution to perform the reaction for 30 minutes.

Thereafter, centrifugation was performed at 10,000 rpm for 10 minutes to dump the supernatant of the upper layer, the residual precipitate was re-dispersed in distilled water, and the centrifugation process was repeated to manufacture the carrier-hollow metal nanoparticle complex.

Figure 6:
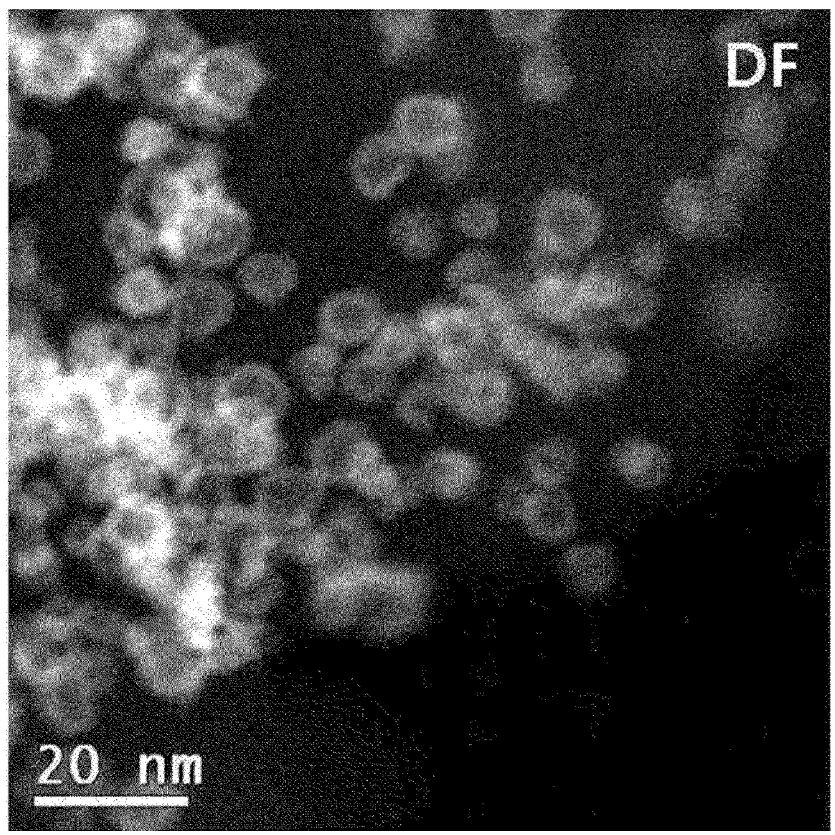
FIGS. 6 and 7 illustrate a transmission electron microscope (TEM) image of a carrier-hollow metal nanoparticle complex manufactured by Preparation Example 2.
Figure 7:
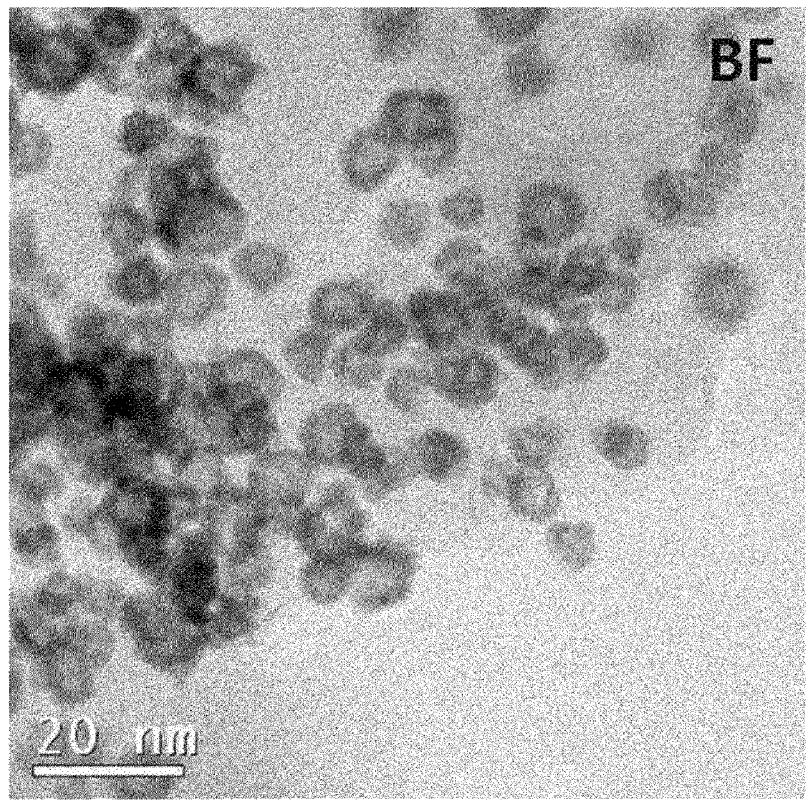

The transmission electron microscope (TEM) image of the carrier-hollow metal nanoparticle complex of the present application manufactured according to Preparation Example 2 is illustrated in FIGS. 6 and 7. FIG. 6 illustrates the dark field of the TEM, and FIG. 7 illustrates the bright field of the TEM.

Preparation Example 3

$Ni(NO_3)_2$ as the first metal salt, $K_2PtCl_4$ as the second metal salt, trisodium citrate as the stabilizer, ammonium lauryl sulfate (ALS) as the first surfactant, and sodium 1-heptane sulfonate (S 1-HS) as the second surfactant were added to distilled water to form the solution, and agitated for 30 minutes. In this case, the mole ratio of $Ni(NO_3)_2$ and $K_2PtCl_4$ was 3:1, the concentration of SDS was two times of the critical micelle concentration with respect to water, and the concentration of S 1-HS was 1/2 mole of that of ALS. Thereafter, the carbon (KETJEN black) dispersed in distilled water was added to the solution to be agitated for 30 minutes, and NaBH$_4$ that was the reducing agent was then added to the solution to perform the reaction for 30 minutes.

Thereafter, centrifugation was performed at 10,000 rpm for 10 minutes to dump the supernatant of the upper layer, the residual precipitate was re-dispersed in distilled water, and the centrifugation process was repeated to manufacture the carrier-hollow metal nanoparticle complex.

Figure 8:
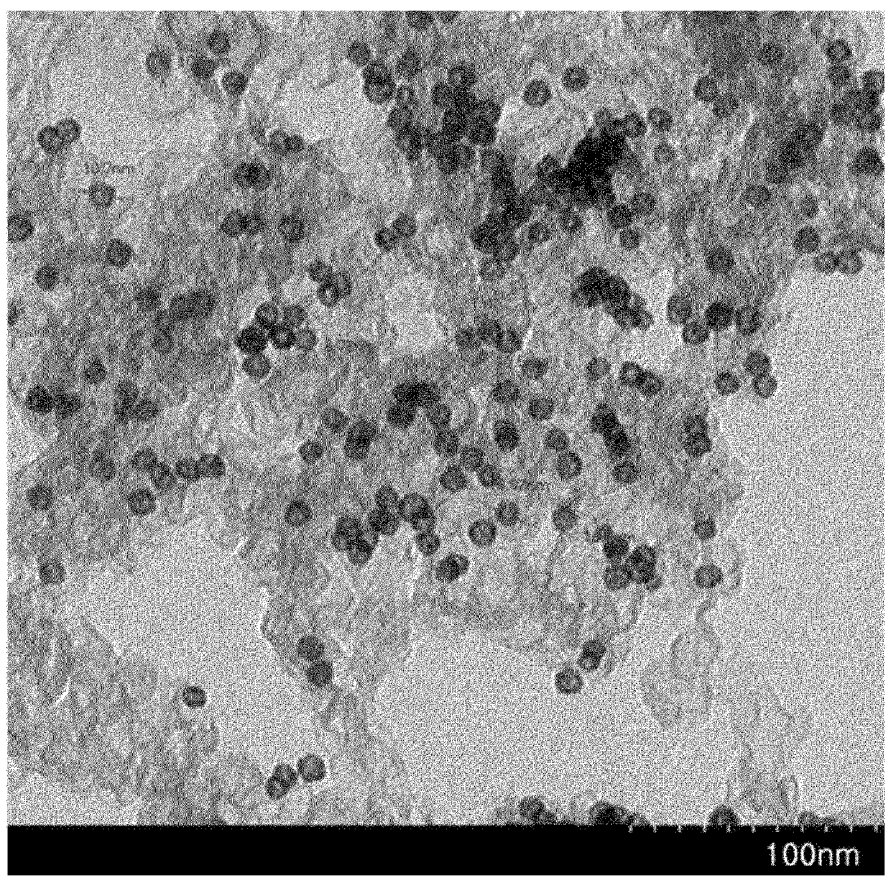
FIG. 8 illustrates a transmission electron microscope (TEM) image of the carrier-hollow metal nanoparticle complex according to the exemplary embodiment of the present application.

The transmission electron microscope (TEM) image of the carrier-hollow metal nanoparticle complex of the present application manufactured according to Preparation Example 3 is illustrated in FIG. 8. Reviewing FIG. 8, it can be confirmed that the diameter of the hollow metal nanoparticle formed on the carrier is 10.7 nm, 10.6 nm, 8.78 nm, 10.5 nm, 8.92 nm, and 10.3 nm from the left of the drawing.

Figure 9:
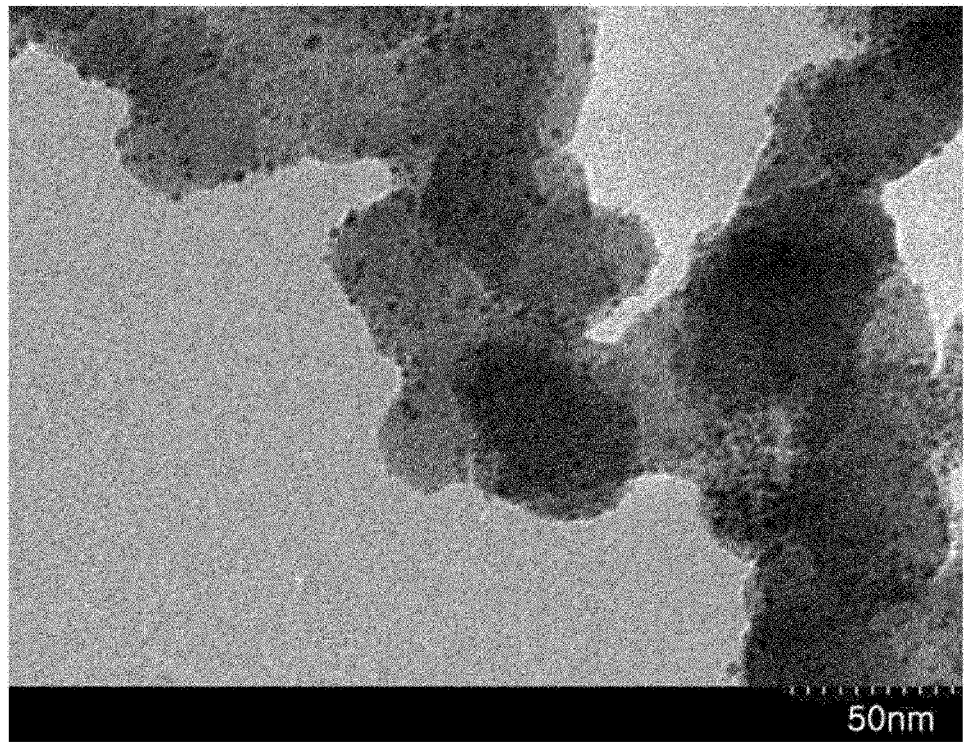
FIG. 9 illustrates a transmission electron microscope (TEM) image of an existing carrier-metal nanoparticle complex.

As illustrated in FIGS. 2 to 8, it can be confirmed that the hollow metal nanoparticle of the carrier-hollow metal nanoparticle complex according to the present application has the hollow shape on the carrier and the cavity is formed. On the other hand, FIG. 9 is the transmission electron microscope (TEM) image of the existing carrier-metal nanoparticle complex, and it can be confirmed that the metal nanoparticle does not have the hollow shape but has the sphere shape of solids.

Therefore, in the fuel cell according to the exemplary embodiment of the present application, the carrier-hollow metal nanocomplex may be included as the catalyst in at least one electrode of the cathode and the anode to increase catalyst activity by the wide surface area and high carrier dispersivity of the nanoparticle, and moreover, increase performance of the fuel cell.

Although the exemplary embodiments of the present application are described with reference to the accompanying drawings, the present application is not limited to the exemplary embodiments but may be manufactured in different forms, and it will be apparent to those skilled in the art that various modifications and changes may be made thereto without departing from the essential feature of the application. Therefore, it should be understood that the above exemplary embodiments are illustrative only but are not limitative in all aspects.

EXPLANATION OF REFERENCE NUMERALS AND SYMBOLS

1: Carrier
2: Hollow metal nanoparticle
3: Core portion
4: Shell portion
5: Cavity
10: Electrolyte membrane
20, 21: Catalyst layer
30, 31: Fine pore layer
40, 41: Electrode base material
50, 51: Gas diffusion layer
60: Stack
70: Oxidizing agent supply portion
80: Fuel supply portion
81: Fuel tank
82: Pump

The invention claimed is:

1. A fuel cell comprising:
a cathode;
an anode; and
an electrolyte membrane provided between the cathode and the anode,
wherein at least one of the cathode and the anode includes a carrier-hollow metal nanoparticle complex where a hollow metal nanoparticle including a hollow core portion, a shell portion including a first metal and a second metal, and a cavity ranging from an external surface of the shell portion to the hollow core in one or two or more regions of the shell portion is carried in a carrier,
wherein a diameter of the cavity is 5% or more and 30% or less of a particle diameter of the hollow metal nanoparticle, and
wherein the shell portion is a single layer.

2. The fuel cell of claim 1, wherein the hollow metal nanoparticle includes one cavity.

3. The fuel cell of claim 1, wherein a particle diameter of the hollow metal nanoparticle is 1 nm or more and 30 nm or less.

4. The fuel cell of claim 1, wherein the hollow metal nanoparticle has a sphere shape.

5. The fuel cell of claim 1, wherein a thickness of the shell portion is more than 0 nm and 5 nm or less.

6. The fuel cell of claim 1, wherein a particle diameter of the hollow metal nanoparticle is in a range of 80% to 120% of an average particle diameter of the hollow metal nanoparticles.

7. The fuel cell of claim 1, wherein a volume of the hollow core portion is 50 vol % or more of the hollow metal nanoparticle.

8. The fuel cell of claim 1, wherein the hollow core portion includes a surfactant.

9. The fuel cell of claim 1, wherein an atomic percentage ratio of the first metal and the second metal of the shell portion is 1:5 to 10:1.

10. The fuel cell of claim 1, wherein the first metal and the second metal are each independently at least one selected from the group consisting of a metal belonging to Group III to XV on a periodic table, a metalloid, a lanthanum metal, and an actinium metal.

11. The fuel cell of claim 1, wherein the first metal and the second metal are each independently at least one selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

12. The fuel cell of claim 1, wherein the carrier is a carbon-based material.

13. The fuel cell of claim 1, wherein a carrying ratio of the hollow metal nanoparticle to the carrier is 10 wt % to 70 wt %.

14. The fuel cell of claim 1, wherein the first metal or the second metal are different from each other, and the first metal or the second metal is nickel.

15. The fuel cell of claim 1, wherein the first metal or the second metal are different from each other, and the first metal or the second metal is platinum.

16. The fuel cell of claim 1, wherein the first metal is nickel and the second metal is platinum.

17. A method of manufacturing a fuel cell, comprising:
preparing an electrolyte membrane;
forming a cathode on one surface of the electrolyte membrane; and
forming an anode on another surface of the electrolyte membrane,
wherein at least one of the cathode and the anode includes a carrier-hollow metal nanoparticle complex where a hollow metal nanoparticle including a hollow core portion, a shell portion including a first metal and a second metal, and a cavity ranging from an external surface of the shell portion to the hollow core in one or two or more regions of the shell portion is carried in a carrier, wherein a diameter of the cavity is 5% or more and 30% or less of a particle diameter of the hollow metal nanoparticle, and wherein the shell portion is a single layer.

18. The method of claim 17, wherein at least one of the forming of the cathode and the forming of the anode further includes manufacturing the carrier-hollow metal nanoparticle complex, and the manufacturing of the carrier-hollow metal nanoparticle complex includes forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent;

adding the carrier to the solution to perform agitation; and adding a reducing agent to the solution to form the hollow metal nanoparticle on the carrier.

* * * * *